United States Patent [19]

Bliamptis

[11] 4,365,620

[45] Dec. 28, 1982

[54] REVERSIBLE WINDOW FOR SOLAR HEATING AND COOLING

[76] Inventor: Emmanuel E. Bliamptis, 20 Phinney Rd., Lexington, Mass. 02173

[21] Appl. No.: 177,336

[22] Filed: Aug. 12, 1980

Related U.S. Application Data

[63] Continuation of Ser. No. 937,019, Aug. 25, 1978, abandoned.

[51] Int. Cl.$^3$ .............................................. F24U 3/02
[52] U.S. Cl. .................................... 126/429; 126/444; 52/171
[58] Field of Search ................. 26/417, 419, 428, 429, 26/431, 444, 446, 901; 98/88 L, 88 R, 90; 52/96, 171, 204, 788

[56] References Cited

U.S. PATENT DOCUMENTS 2,918,709 12/1959 Cocoran ............................... 126/417
3,925,945 12/1975 White .................................. 126/429

OTHER PUBLICATIONS

"Semi-Transparent Solar Collector Window Systems" N. Fuschillo, *Solar Energy*, vol. 17, pp. 159–165, 1975.

*Primary Examiner*—Samuel Scott
*Assistant Examiner*—Lee E. Barrett
*Attorney, Agent, or Firm*—Donald J. Singer; Sherman H. Goldman

[57] ABSTRACT

A reversible, variably inclinable window with controlled convection for mounting in a window casing in a building for solar heating and cooling comprising a window frame having top and bottom portions and being adapted to pivot about a horizontal axis intermediate said portions, a first window panel mounted in said frame capable of transmitting both visible and infrared radiation, a second window panel mounted in said frame, substantially parallel and in a spaced relationship to said first window panel and being capable of transmitting visible radiation and blocking infrared radiation, and openings proximate to said top and bottom portions for providing air passageways to space between said first and second window panels such that rotation of the assembly about its horizontal axis can place either of the panels toward the outside of the building for selective reflection or absorbtion of the radiant energy to enable heating or cooling of the interior space between the panels in order to utilize the properties of the air caused to pass therethrough; and sealing means at the sides of the window casing for sealing against the window frame while allowing for optimization of the inclination angle of the window with respect to radiant energy impinging thereon.

3 Claims, 5 Drawing Figures

REVERSIBLE WINDOW FOR SOLAR HEATING AND COOLING

STATEMENT OF GOVERNMENT INTEREST

The invention described herein may be manufactured and used by or for the Government for governmental purposes without the payment of any royalty thereon.

CROSS REFERENCE TO RELATED APPLICATION

This is a continuation of Application Ser. No. 937,019, filed Aug. 25, 1978, now abandoned.

BACKGROUND OF THE INVENTION

This invention relates generally to solar heating and cooling and more particularly to a reversible transparent building panel or window that will provide beneficial effects as the seasons and the days change.

A great deal of interest has been shown recently in using the energy of the sun to supplement our supply of fossil fuel. Unfortunately, in the field of heating and cooling of homes, office building and factories the solar radiation is most intense during the period when cooling is required and least intense when heating is required.

With regard to the various methods and devices that attempt to provide cooling from the sun's radiation one must consider that a very large number of devices have been devised in the general categories of reflections and absorption. Concerning the heating aspect of solar radiation, many complex methods have been conceived for using the sun's energy and storing that energy for night use.

Even with all the concern about solar heating and cooling, there has never been a window that provides heating and cooling through controlled convection. There has long been the need for such a window that is also inexpensive to construct and simple to maintain.

SUMMARY OF THE INVENTION the invention provides a simple, passive and inexpensive way for exploiting solar energy for both heating and cooling, while retaining the customary usefulness of the device as a window.

The window is double paned with one pane constructed of material transmitting both visible and infrared radiation and the other pane constructed of material transmitting visible radiation but blocking infrared radiation. The entire assembly rotates about a horizontal axis so that in summer the pane blocking infrared radiation faces outwardly and the pane transmitting all radiation faces inwardly. The situation is reversed in winter.

Holes near the top and bottom of the infrared blocking pane allow heated air to be discharged into the useful (room) area or outside as required. Heating and cooling is provided in this manner.

In addition, the window assembly is appropriately inclined to the vertical thereby providing additional reflection/transmission benefits.

It is therefore an object of the invention to provide a new and improved reversible window for solar heating and cooling.

It is another object of the invention to provide a new and improved reversible window for solar heating and cooling that provides a passive use of solar radiation.

It is a further object of the invention to provide a new and improved reversible window for solar heating and cooling that maximizes the use of reflection/transmission benefits through variable inclination.

It is still another object of the invention to provide a new and improved reversible window for solar heating and cooling that retains its customary usefulness as a window.

It is still a further object of the invention to provide a new and improved reversible window for solar heating and cooling that is simple in design and inexpensive to manufacture.

It is another object of the invention to provide a new and improved reversible window for solar heating and cooling that utilizes the principal of controlled convection.

These and other advantages, features and objects of the invention will become more apparent from the following description taken in connection with the illustrative embodiment in the accompanying drawings.

DESCRIPTION OF THE PREFERRED EMBODIMENT

Figure 1:
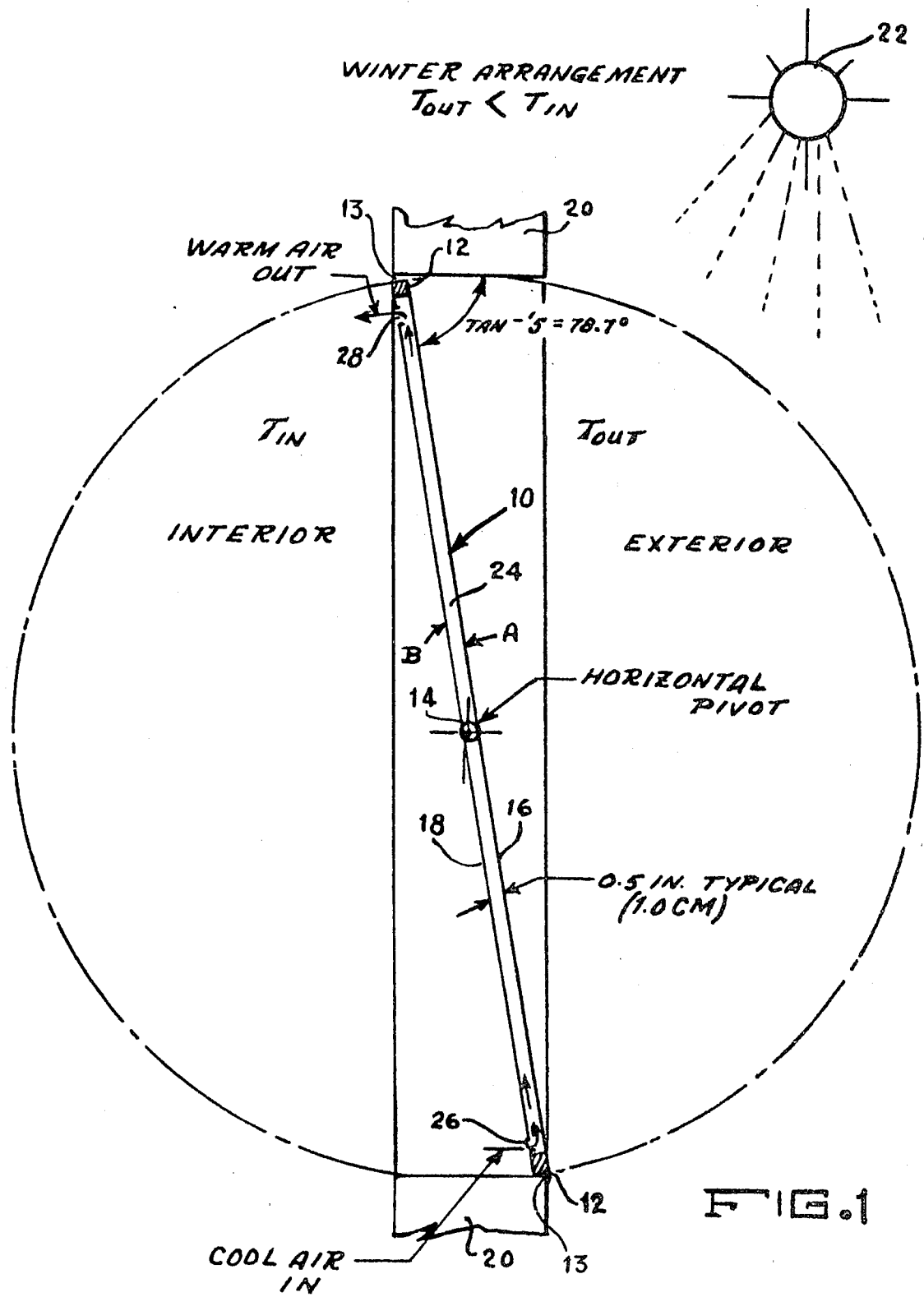
FIG. 1 is a side elevation view of the invention in a heating position.
Figure 2:
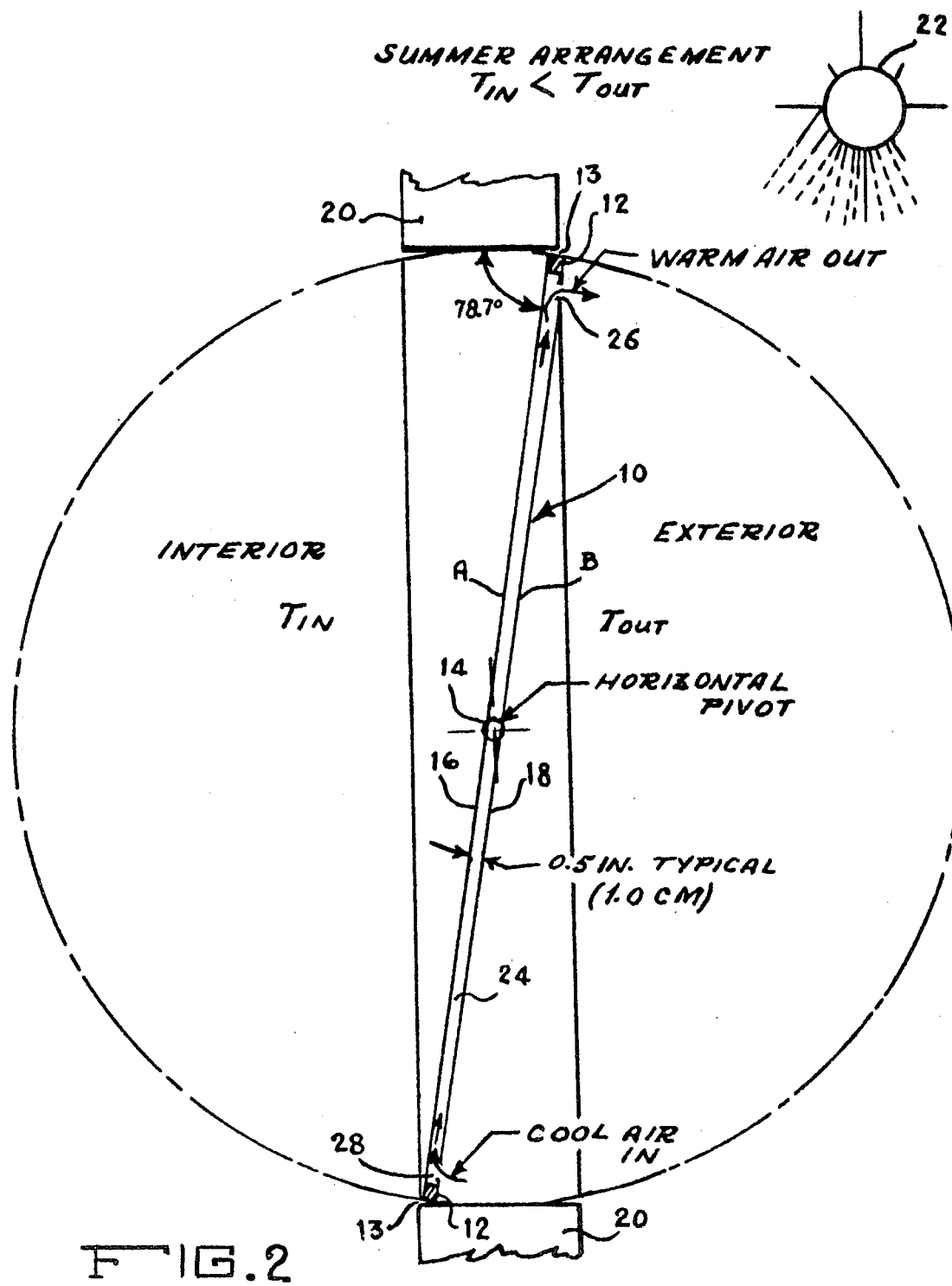
FIG. 2 is a side elevation view of the invention in a cooling position.

Referring now to FIGS. 1 and 2, the window is shown in the winter or heating position in FIG. 1 and the cooling or summer position in FIG. 2. The window 10 is formed of a conventional wood, plastic or metal frame, a portion of which is shown at 12, and to which a thermal and air seal 13 is affixed. The glass would be double glazed in the frame in a conventional manner with the panes separated by an air space 24 of approximately 1 cm. The frame is adapted to pivot about a horizontal axis approximately half way between the two ends of the window at point 14. There is hardware currently available for this purpose.

The window panes consist of a first pane 16 which is formed of a material that will transmit both visible light and the infrared spectrum. A second panel 18 is formed of a material such as TiO$_2$/Ag/TiO$_2$ film on a base of glass, Mylar or Sunlite (by the Kalwal Corp. of Manchester, N.H.), which will pass visible radiation but blocks infrared radiation. This second panel (18) has apertures 26 and 28 located near the bottom and top that will allow air flow between the window panels.

The window is sealed along all sides to the casing and wall as will be described hereinafter.

In winter operation, as is shown in FIG. 1, the window is positioned at an angle which can be varied, depending upon the width of the window casing, to optimize transmission/reflection characteristics with respect to the sun's rays 32. With the casing depth shown in FIGS. 1 and 2, 78.7° is the maximum angle of inclination achievable. Pane 16 faces the sun transmitting both visible and infrared radiation to the space 24 between the panes. The visible portion of the spectrum will then pass through pane 18 and into the interior of the building while the infrared is blocked and absorbed by pane 18.

Cool room air entering space 24 via apertures 26 is heated as it rises across pane 18 and is allowed to escape through apertures 28 at the upper end of pane 18.

This controlled convection process provides an enhanced heating mechanism for the interior of the building using solar radiation. Correspondingly, infrared radiation from the interior of the building when impinging on the interior pane (18) is blocked and absorbed and heat does not escape through the window. This mechanism is in essence an enhancement of the so called "greenhouse effect".

In summer operation the device functions in the reverse manner. Pane 18 forms the outward face of the window and blocks thermal infrared radiation incident from outside. Whatever thermal energy passes through pane 18 heats up the air in space 24, and this heated air enters from and escapes to the outside via apertures 28 and 26 respectively, carrying away unwanted heat. Simultaneously, short wave radiation from the interior can escape to the outside. The device thus provides an enhancement and inversion of the "greenhouse effect".

The normal winter mounting of the window on the vertical portion of the wall or casing 20 results in increased benefits since it reduces the angle of incidence of the incoming solar radiation, thereby increasing its transmission to the interior of the building. Alternatively, when the window is rotated about its horizontal pivot and is disposed in its summer arrangement for a summer mounting, the angle of incidence is increased and the transmission of solar radiation reduced.

Figure 3A:
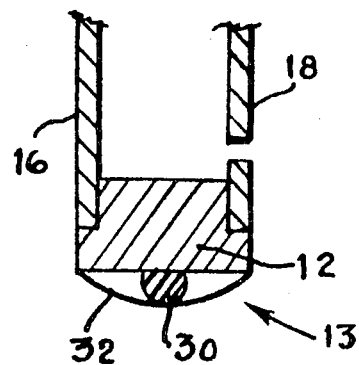
FIGS. 3a and 3b are segments of the invention partly in section and detailing alternative forms of the environmental seal which may be used at the top and bottom of the window.
Figure 3B:
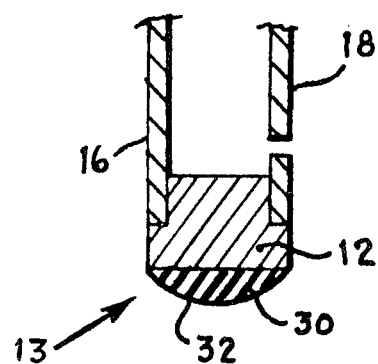

FIGS. 3a and 3b show alternative thermal and air seals 13 between the window frame 12 and the horizontal portion of the wall or casing 20, which forms the aperture for the window frame. A half round rubber strip 30 of hard or semi-hard material may be attached to the wooden frame 12 at the top and bottom. The rubber strip may take alternative slopes as shown. To perfect the seal a thin sheet of foam rubber 32 is placed over the hard rubber.

Figure 4:
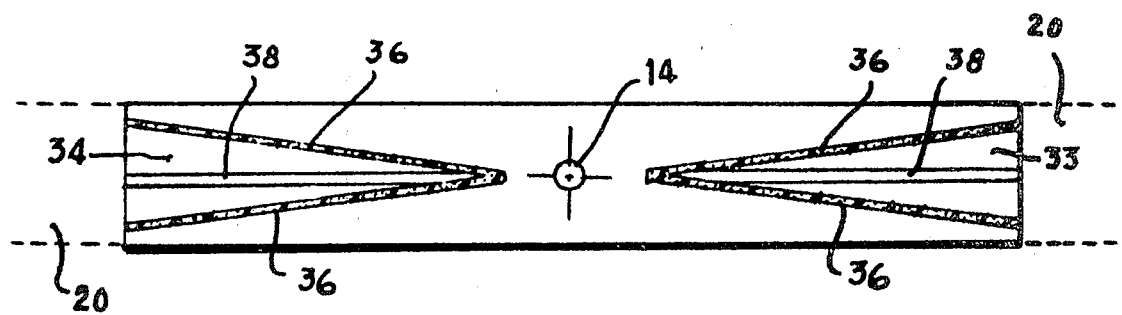
FIG. 4 ia a plan view of one side of the window casing.

Regarding FIG. 4, the vertical portion of the wall or casing is shown, for purposes of illustration only, on its side. Pivot 14 is positioned centrally of the window aperture. The seal between the window frame and the vertical portions of the casing may be achieved by means of two triangular pieces 33, 34 attached to the casing and faced with foam rubber 36 or other like material, so that the window frame securely engages them in both winter and summer configurations. A screen may be mounted in these casing stops utilizing grooves 38 in the casing so that the window may be opened by rotating the window to a substantially horizontal position to allow ventilation of the building interior while barring the way to insects.

Although the invention has been described with reference to a particular embodiment, it will be understood to those skilled in the art that the invention is capable of a variety of alternative embodiments within the spirit and scope of the appended claims.

I claim:

1. In a building structure having a wall of a given thickness and an aperture therein for accommodating a window, the improvement residing in a window in the form of a transparent insulating building panel, said transparent, insulating building panel being reversibly mounted for positioning in said wall commensurate with the outside temperature and having a first set inclination position and a second set inclination position, said transparent, insulating building panel comprising:

a frame having a thickness substantially less than the thickness of said wall, said frame being structured to fit substantially in register with said aperture, means for pivotably mounting said frame in said aperture about a horizontal axis at the center of said wall, the first frame set inclination position being oriented such that the upper edge of said frame is proximate to the upper interior edge of said aperture and the lower edge of said frame is proximate to the lower exterior edge of said aperture, and the second frame set inclination position being oriented such that the upper edge of said frame is proximate to the upper exterior edge of said aperture and the lower edge of said frame is proximate to the lower interior edge of said aperture, a pair of spaced apart transparent panels mounted within said frame, one of said transparent panels being capable of transmitting visible and infrared radiation while the other of said transparent panels is capable of transmitting visible radiation and reflecting infrared radiation, means remote from said horizontal axis for providing passageways from the space between said pair of transparent panels with the outer side of said other of said transparent panels capable of reflecting infrared radiation; and means for sealing said frame to said wall at said first and second frame set inclination positions.

2. A transparent, insulating building panel as defined in claim 1, wherein said means for sealing includes means mounted to said frame for engagement with said wall.

3. A transparent, insulating building panel as defined in claim 1, wherein said means for sealing includes means mounted to said wall extending from said horizontal axis for engagement with said frame.

* * * * *